(12) United States Patent
Kasahara (10) Patent No.: US 8,639,029 B2
(45) Date of Patent: Jan. 28, 2014

(54) IMAGE PROCESSOR AND IMAGE PROCESSING METHOD

(75) Inventor: Ryosuke Kasahara, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 142 days.

(21) Appl. No.: 13/414,835

(22) Filed: Mar. 8, 2012

(65) Prior Publication Data

US 2012/0237123 A1    Sep. 20, 2012

(30) Foreign Application Priority Data

Mar. 18, 2011   (JP) .................................. 2011-060553

(51) Int. Cl.
*G06K 9/36*   (2006.01)

(52) U.S. Cl.
USPC ........... 382/166; 382/162; 382/167; 382/232; 382/233; 382/250; 358/518; 358/520; 358/523

(58) Field of Classification Search
USPC ......... 382/162, 166, 167, 232, 233, 240, 250, 382/251; 358/518, 520, 523; 345/596, 690, 345/697
See application file for complete search history.

(56) References Cited

U.S. PATENT DOCUMENTS

| 6,195,472 | B1 * | 2/2001 | So et al. ........................ 382/296 |
| 7,619,790 | B2 * | 11/2009 | Kambegawa et al. ........ 358/500 |
| 8,106,973 | B2 | 1/2012 | Kasahara |
| 2003/0044077 | A1 | 3/2003 | Okada |
| 2009/0040556 | A1 * | 2/2009 | Kambegawa et al. ....... 358/1.15 |
| 2009/0087123 | A1 * | 4/2009 | Izawa et al. .................. 382/284 |
| 2009/0135277 | A1 | 5/2009 | Kasahara |
| 2009/0190008 | A1 | 7/2009 | Kasahara |
| 2009/0190855 | A1 | 7/2009 | Kasahara |
| 2009/0201417 | A1 | 8/2009 | Kasahara |
| 2009/0202171 | A1 | 8/2009 | Kasahara |
| 2009/0226086 | A1 | 9/2009 | Kasahara |
| 2009/0231416 | A1 | 9/2009 | Kasahara |

(Continued)

FOREIGN PATENT DOCUMENTS

| EP | 2293240 | 3/2011 |
| JP | 2008-061172 A | 3/2008 |
| JP | 2009-177703 A | 8/2009 |
| JP | 2010-081479 A | 4/2010 |

OTHER PUBLICATIONS

European Search Report dated Jun. 27, 2012 issued in corresponding European Application No. 12159611.8.

(Continued)

*Primary Examiner* — Ali Bayat
(74) *Attorney, Agent, or Firm* — Harness, Dickey & Pierce, P.L.C.

(57) ABSTRACT

An image processor having an image compression unit to generate first compressed image data by dividing input image data into blocks of M×M pixels with regard to at least luminance signals (Y) of the input image data, wavelet-converting the image data in units of blocks, and reducing the number of bits by quantization, a memory to store the first compressed image data, a coordinate calculator to calculate coordinates to deform images by coordinate conversion and output coordinate information, a compressed image deforming unit to generate compressed deformed image data by reading out the first compressed image data stored in the memory while conducting coordinate conversion based on the coordinate information from the coordinate calculator, and a first image decompression unit to decompress the compressed deformed image data to obtain decompressed image data.

17 Claims, 8 Drawing Sheets

(56) References Cited

U.S. PATENT DOCUMENTS

| | | |
|---|---|---|
| 2009/0231472 A1 | 9/2009 | Kasahara |
| 2009/0238455 A1 | 9/2009 | Kasahara |
| 2010/0002105 A1 | 1/2010 | Kasahara |
| 2010/0079622 A1 | 4/2010 | Kasahara et al. |
| 2011/0050714 A1 | 3/2011 | Sekiguchi et al. |
| 2011/0292240 A1 | 12/2011 | Sekiguchi et al. |

OTHER PUBLICATIONS

Iddo Drori et al., "Fast Multiresolution Image Operations in the Wavelet Domain," *IEEE Transactions on Visualization and Computer Graphics*, vol. 9, No. 3, pp. 395-411 (Jul. 1, 2003) XP001168631.

* cited by examiner

ORIGINAL IMAGE

FIG. 6B

OUTPUT IMAGE

IMAGE PROCESSOR AND IMAGE PROCESSING METHOD

CROSS-REFERENCE TO RELATED APPLICATION

This patent application is based on and claims priority pursuant to 35 U.S.C. §119 to Japanese Patent Application No. 2011-060553, filed on Mar. 18, 2011, the entire disclosure of which is hereby incorporated by reference herein.

BACKGROUND OF THE INVENTION

The present invention relates to an image processor and an image processing method that correct image deformation using coordinate conversion. Description of the Related Art In recent years, camera systems have been developed in which images taken by the fisheye lens of a rearview camera to enable the driver to see what is behind the vehicle are processed to correct distortion stemming from the fisheye lens or subjected to image deformation based on viewpoint switching to obtain an overhead image, thereby providing vehicle drivers with images easy to view (for example, Japanese Patent Application Publication Nos. JP-2009-177703-A and JP-2010-81479-A).

In this type of camera system, part of an image is cut out and the part of the image output by the camera is enlarged to achieve the capability described above by correction. Therefore, to express details of the enlarged image, use of high-definition cameras having one megapixels or more have come to be demanded in recent years.

However, high-definition cameras have problems with the access speed and capacity of the memory used as the frame buffer.

With regard to the access speed, random access to the frame buffer memory address is required for coordinate conversion. In addition, the throughput of DRAMs, etc. for use in the frame buffer is large for a burst read in which sequential addresses are read but decreases drastically in the case of random access. Therefore, read speed is too slow for high-definition images, thereby making it impossible to continue coordinate conversion. Furthermore, to conduct coordinate conversion for high-definition images, interpolating between pixels is required. In interpolation, for output of a single pixel, reading data for two (for interpolation only in the horizontal direction) or four (for both horizontal and vertical interpolation) pixels around that single pixel is required, and with a significantly high throughput.

Furthermore, with regard to the capacity of the memory, to store the data obtained by a high-definition camera, a memory having a relatively large capacity is required in comparison with a low-definition camera. For example, just for storing each piece of RGB 8-bit data using a camera having around one megapixels, the capacity required is somewhere around the following:

VGA (0.3 M pixels): 640×480×24 (RGB)×two faces (double buffer)=14.7 Mbits.

WVGA (0.1 M pixels): 1,280×800×24 (RGB)×two faces (double buffer)=49.2 Mbits.

In an effort to solve this problem, for example, JP-2008-61172-A describes a technique of processing the data to be stored in the frame buffer. However, the capacity required is still around two-thirds that calculated, which is not a sufficient reduction for a camera having a capacity on the order of megapixels. As a result, use of expensive RAMs having a large capacity is required.

SUMMARY OF THE INVENTION

In view of the foregoing, the present invention provides an image processor having an image compression unit to generate first compressed image data by dividing input image data into blocks of M×M pixels with regard to at least luminance signals (Y) of the input image data, wavelet-converting the image data in units of blocks, and reducing the number of bits by quantization, a memory to store the first compressed image data, a coordinate calculator to calculate coordinates to deform images by coordinate conversion and output coordinate information, a compressed image deforming unit to generate compressed deformed image data by reading out the first compressed image data stored in the memory while conducting coordinate conversion based on the coordinate information from the coordinate calculator, and a first image decompression unit to decompress the compressed deformed image data to obtain decompressed image data.

As another aspect of the present invention, an image processing method including the steps of compressing input image data to generate first compressed image data in which the input image data are divided into blocks of M×M pixels with regard to at least luminous signals (Y), followed by wavelet conversion by block and reduction of the number of bits by quantization, storing the first compressed image data in a memory, calculating coordinates to obtain and output coordinate information to deform the input image by coordinate conversion, generating compressed deformed image data by reading out the first compressed image data stores in the memory while conducting coordinate conversion based on the coordinate information, and decompressing the compressed deformed image data to obtain decompressed image data.

BRIEF DESCRIPTION OF THE SEVERAL VIEWS OF THE DRAWINGS

Various other objects, features and attendant advantages of the present invention will be more fully appreciated as the same becomes better understood from the detailed description when considered in connection with the accompanying drawings, in which like reference characters designate like corresponding parts throughout and wherein.

DETAILED DESCRIPTION OF THE INVENTION

Embodiments of the present disclosure are described in detail with reference to accompanying drawings.

Embodiment 1

Figure 1:
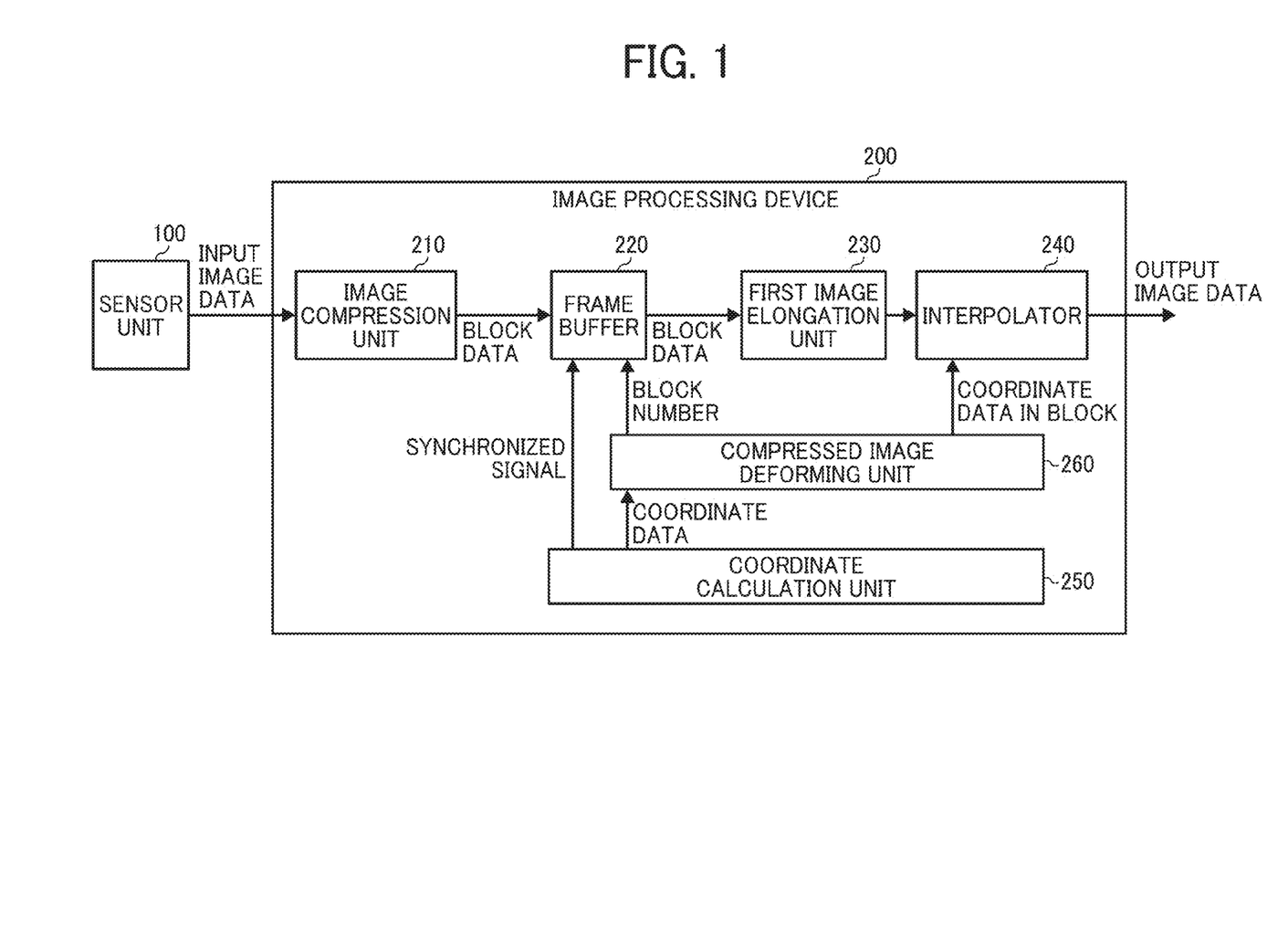
FIG. 1 is a diagram illustrating the entire configuration of one embodiment of an image processor according to the present disclosure.

FIG. 1 is a diagram illustrating the entire of one embodiment of the image processor of the present disclosure.

A sensor unit 100 has an image processor in addition to an optical lens system, a camera such as a charge-coupled device (CCD) and a complementary metal-oxide semiconductor (CMOS), an A/D conversion circuit. The sensor unit 100 converts the optical image of an object into electric signals followed by A/D conversion and processing such as Bayer Interpolation, YUV conversion, and sharpness and outputs image data sequentially. An image processor 200 inputs the image data (YUV data) sequentially from the sensor unit 100 followed by distortion correction processing or viewpoint switching processing by coordinate conversion to output deformed images sequentially. The structure and processing of the image processor 200 are described later.

A display unit is connected to the image processor 200 and the output image data therefrom are displayed as they are or after the data are converted into video signals of NTSC format.

In this embodiment, the image processor 200 has an image compression unit 210 to generate compressed image data by compressing the input image data (YUV data), a frame buffer 220 to store the compressed image data, an image decompression unit 230 to conduct an decompression processing of the compressed image data (compressed deformed image data) read out from the frame buffer 220, an interpolator 240 to conduct an interpolation processing of the decompressed image data, a coordinate calculator 250 to calculate the coordinate to deform the image by coordinate conversion, and a compressed image deforming unit 260 to generate compressed deformed image data by reading out the compressed image data from the frame buffer 220 based on the output information (coordinate information) from the coordinate calculator 250.

For example, in the case of a vehicle mounted camera system, the image processor 200 is accommodated in a chassis together with the sensor unit 100. The chassis is attached to the back of the vehicle for use. The sensor unit 100 outputs clock signals and horizontal and vertical synchronizing signals together with image data.

The image processor 200 may generates the clock signals and the horizontal and vertical synchronizing signals and supplies them to individual units or the image sensor 100 in the system.

Figure 2A:
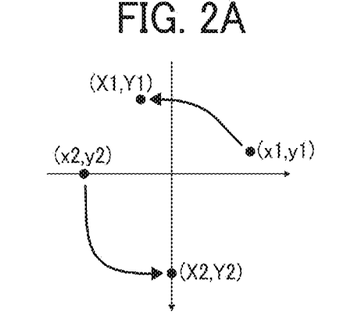
FIGS. 2A and 2B are diagrams of describing the principle of generation of deformed images by coordinate conversion.
Figure 2B:
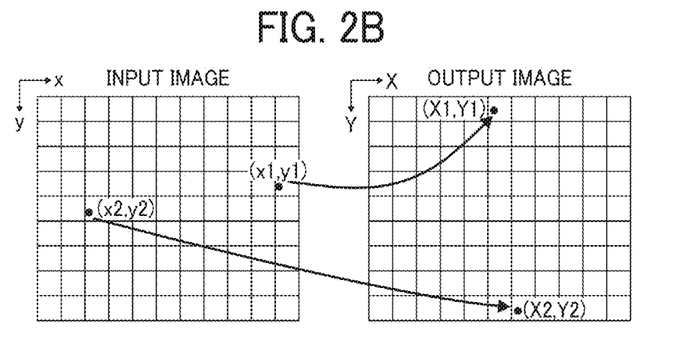

The principle of the generation of deformed images is described first. The deformed image is generated by writing image data (input image) output from the camera as they are once and reading out from different addresses (coordinates). FIG. 2 is a diagram illustrating an example in which a deformed image is generated by deforming the input image by 90° rotation. FIG. 2A indicates the positional relationship on the coordinate of two pixels before and after the conversion and FIG. 2B indicates the positional relationship of the pixels corresponding to the input image and output image saved in the frame memory. That is, when the image data are read out from the frame buffer, the image data of the pixel on the coordinate (x1, y1) on the input image are read out as the pixel on the coordinate (X1, Y1) on the output image. In addition, as the pixel of the coordinate (X2, Y2) on the output image, the image data of the pixel on the coordinate (x2, y2) on the input image are read out. This is conducted for each pixel on the input image so that the image generated by deforming the input image by 90° rotation is obtained as the output image.

As described above, by deforming the image by coordinate conversion, for example, in a rearview camera to view the back of the vehicle, images obtained by a fish eye lens are processed to correct the distortion of the image inherent to fish eye images or subjected to image deformation based on viewpoint switching to obtain an overhead image, thereby providing vehicle drivers with images easy to view.

As described above, when a camera having a high definition is used, the problems arise with regard to the access speed and the capacity of the memory for use in the frame buffer. In the present disclosure, the compressed image data in which image data are compressed are saved in the frame buffer and used for the process of deforming the image by coordinate conversion. The entire operation of the image processor 200 is described next.

For the input image data (YUV data) from the sensor unit 100, the image compression unit 210 divides the luminance signals (Y) into M×M pixel blocks, conducts wavelet conversion in units of block, and thereafter quantizes the data for reducing the number of bits of high frequency components to generate compressed image data (non-invertible compressed image). In addition, the color signals (UV) are subjected to averaging processing by block to generate compressed image data (non-invertible compressed image). The image compression unit 210 sequentially stores the generated compressed image data in the frame buffer 220.

The coordinate calculator 250 calculates coordinates to correct distortion by coordinate conversion or generate deformed images for viewpoint switching based on the horizontal/vertical synchronization signals and outputs the calculation results to a compressed image deforming unit 260. To be specific, the coordinate calculator 250 calculates the prior-to-conversion coordinates on the input image corresponding to the post-conversion coordinate on the output image in order that the image data of pixels such as coordinates (x1, y1), (x2, y2) on the input image are read out as the pixels of (X1, Y1) (X2, Y2) on the output image (deformed image) when the image data are read out from the frame memory as illustrated in FIG. 2.

Normally, the coordinate calculator 250 has multiple coordinate conversion look-up tables (LUT) preliminarily calculated for deforming images, such as distortion correction, rotation correction, and viewpoint switching correction, and selects a desired coordinate conversion table according to the purpose. The coordinate calculator 250 uses the desired coordinate conversion table, reads out the prior-to-conversion coordinates from the table according to the horizontal/vertical synchronization signal, and outputs it to the compressed image deforming unit 260.

This obviates the need for calculation of prior-to-conversion coordinates on the input image corresponding to the post-conversion coordinate on the output image each time.

The compressed image deforming unit 260 obtains the block containing the prior-to conversion coordinate from the coordinate information received from the coordinate calculator 250 and reads out the compressed image data of the block from the frame buffer 220. In addition, the compressed image deforming unit 260 outputs information (coordinate information in the block) indicating the position of the prior-to-conversion coordinates in the block to the interpolator 240.

For the compressed image data read out from the frame buffer 220, the image decompression unit 230 conducts reverse wavelet conversion for the luminance signals (Y) to conduct decompression to the image data of M×M pixels by block. The color signals (UV) are decompressed to image data of the original format.

For the decompressed image data output from the image decompression unit 230, the interpolator 240 calculates and outputs the pixel values of the target coordinate in the block by a method such as bilinear based on the coordinate information in the block received from compressed image deforming unit 260 with regard to the luminance signals (Y). The color signals (UV), as described later, are output as they are because each block has only one piece of information.

Next, the processes are described specifically. The original data are set to have 8 bits for YUV signals per pixel in this example. With regard to the luminance signals (Y), a single pixel of 8 bits is output as it is from the sensor unit 100. With regard to the color signals (UV), YUV=4:4:4 are converted into YUV=4:2:2 in the sensor unit 100 and two pixels of 8 bits (average of the two pixels) are output for each of UV signals.

Figure 3:
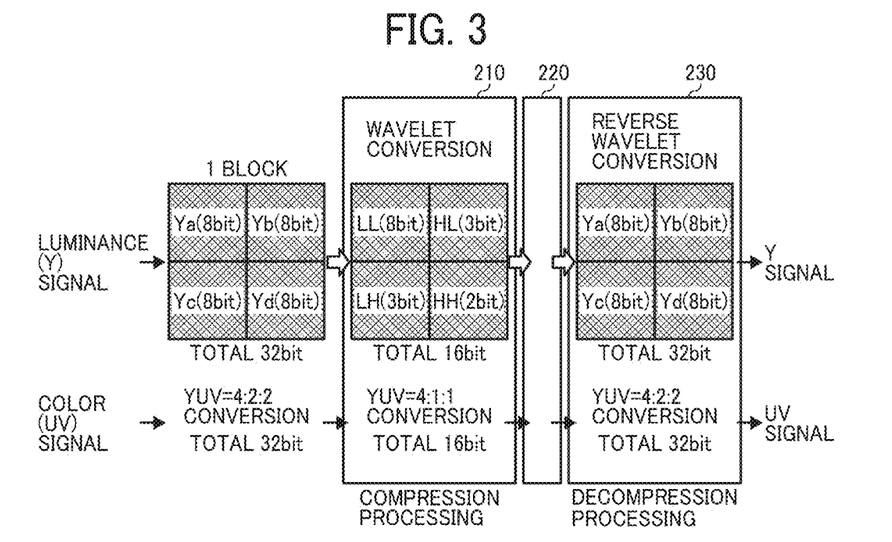
FIG. 3 is a diagram illustrating a processing of image compression and image decompression according to the present application.

FIG. 3 is a diagram illustrating a specific compression/decompression processing image at the image compression unit 210 and the image decompression unit 230.

A single block is 2 pixels×2 pixels here.

For the image data from the sensor unit 100, the image compression unit 210 conducts wavelet conversion by block in which a single block is 2 pixels×2 pixels to generate LL, HL, LH, and HH components (wavelet conversion coefficient) with regard to the luminance signals. Among these, the high frequency component of HL, LH, and HH are quantized to reduce the number of bits. To be specific, LL component is 8 bits, HL and LH components are 3 bits, and HH component is 2 bits. Therefore, the luminance signals (Y) are compressed in such a manner that 32 bits are compressed to 16 bits per block. With regard to the color signals (UV), YUV=4:2:2 are converted into YUV=4:1:1 (average of 2 pixels×2 pixels) by block. The color signals (UV) after the conversion are 8 bits for each. Therefore, the color signals (UV) are compressed in such a manner that 32 bits are compressed to 16 bits per block.

If the Y signals of 4 pixels of a single block are a, b, c, and d, the LL, HL, LH, and HH components are calculated as follows:

$$LL=(a+b+c+d)/4$$

$$HL=(a+c)/2-(b+d)/2$$

$$LH=(a+b)/2-(c+d)/2$$

$$HH=(a-b)-(c-d)$$

For the compressed deformed image data read out from the frame buffer 220, the image decompression unit 230 conducts a reverse wavelet conversion by block to restore data of a single block of 4 pixels with regard to the luminance signals (Y). That is, data of a total of 32 bits having a single pixel of 8 bits and a single block of 4 pixels are restored. The color signals (UV) are converted into the original YUV=4:2:2. That is, for each UV signal, data of a total of 32 bits having 8 bits for two pixels and a single block are restored.

When Y signals having 4 pixels of a single block are a, b, c, and d, these are calculated from the LL, HL, LH, and HH components as follows:

$$a=(4\times LL+2\times HL+2\times LH+HH)/4$$

$$b=(4\times LL+2\times HL+2\times LH-HH)/4$$

$$c=(4\times LL-2\times HL+2\times LH-HH)/4$$

$$d=(4\times LL-2\times HL-2\times LH+HH)/4$$

In the case of the embodiment illustrated in FIG. 3, 16 bits of the luminous information and 16 bits of the color information per four pixels are required while the data amount requiring 24 bits per pixel is required in non-compressed state (8 bits stored for each of RGB) for the frame buffer. That is, the frame buffer requires only a third of the non-compressed state. In addition, burst-writing to perform writing in sequential memory addresses at a high speed can be used for the frame buffer. On the other hand, since the amount of 4 pixels including surrounding pixels can be read out from the frame buffer by reading data of a single block of 32 bits with regard to reading-out for output of a single pixel, interpolating the decimal portion of the coordinate conversion in the XY directions is made possible by using these surrounding pixels so that a high quality coordinate conversion is possible.

Figure 4A:
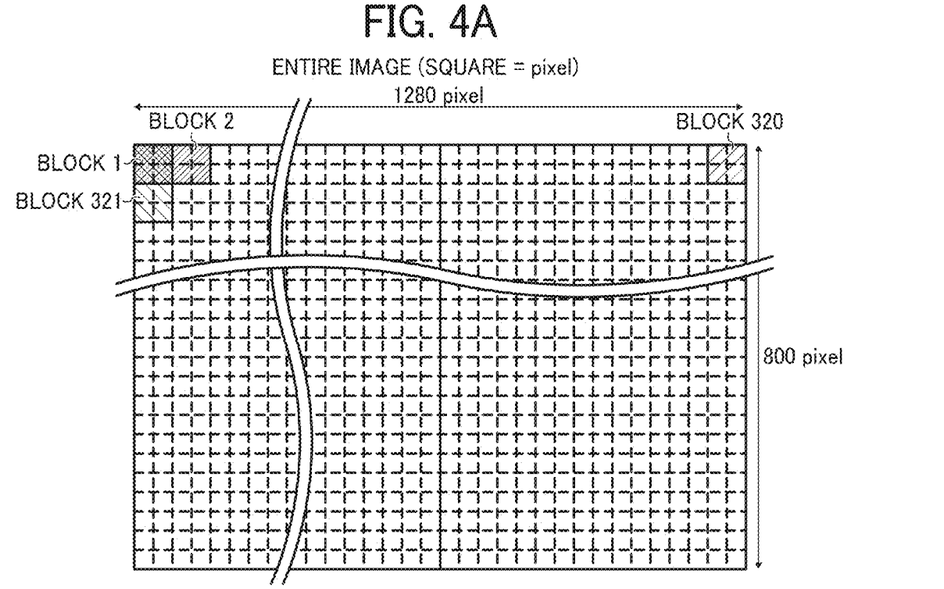
FIGS. 4A and 4B are diagrams illustrating block division and memory storing of a screen.
Figure 4B:
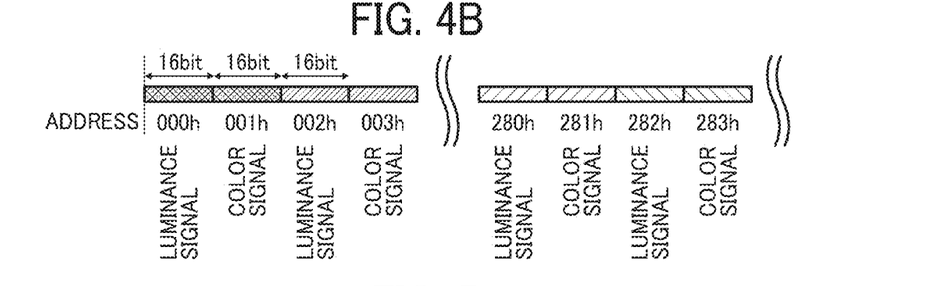

A specific image of the block division of the screen and memory storing method is illustrated in FIGS. 4A and 4B. In FIG. 4A, a screen of 1,280 pixels×800 pixels is divided into blocks each of which has 2 pixels×2 pixels. In the embodiment illustrated in FIG. 3, the compressed image data are 16 bits per block for both the luminance signals and the color signals. A illustrated in FIG. 4B, the luminance signals and the color signals of the single block are stored (burst-writing) in sequential addresses in the frame buffer 220. In addition, data of a single block of 32 bits are read out from the frame buffer 220 by burst-reading of 16 bits×2 addresses.

In order to avoid writing and reading of data in the same frame of the memory at the same time, the frame buffer 220 may employ a double buffer system in which memories for two screens are prepared to separate address spaces for writing and reading.

Figure 5:
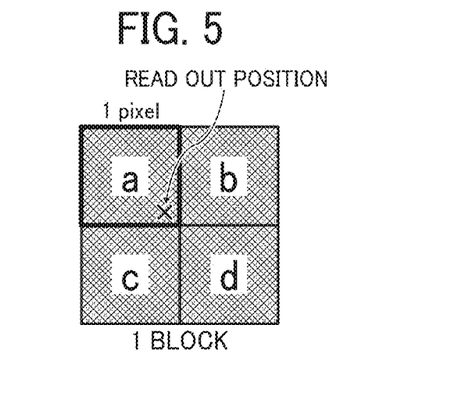
FIG. 5 is a diagram illustrating the processing of interpolation.

As illustrated in FIG. 5, the interpolator 240 applies the bilinear method, etc. for the decompressed data of a, b, c, and d of the 4 pixels for a single block with regard to the luminance signals (Y) and calculates and outputs the weighted average according to the reading-out position (for example, X=0.2, Y=1.2) of the coordinate information in the block from the compressed image deforming unit 260. With regard to the color signals (UV), since the decompressed data from the image decompression unit 230 have one piece of color information per block for each of U and V, the decompressed data are output as they are.

Figure 6A:
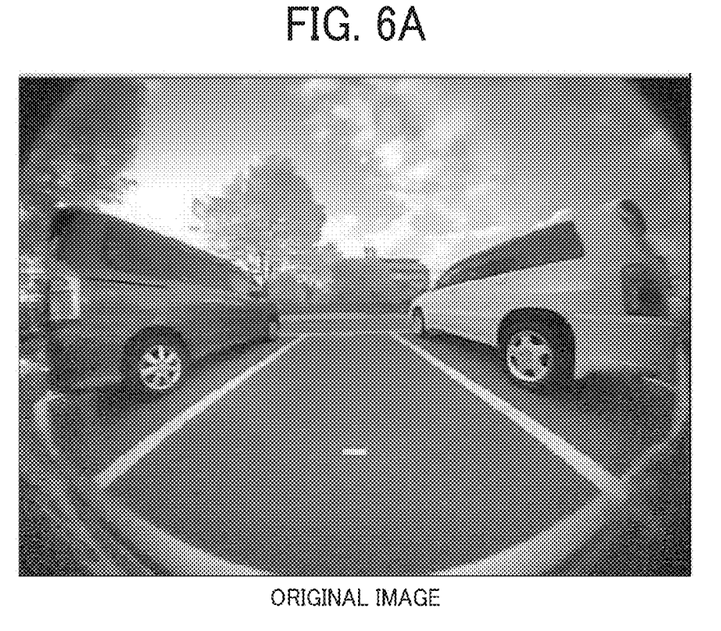
FIGS. 6A and 6B are diagrams illustrating an example of an original image and an output image.
Figure 6B:
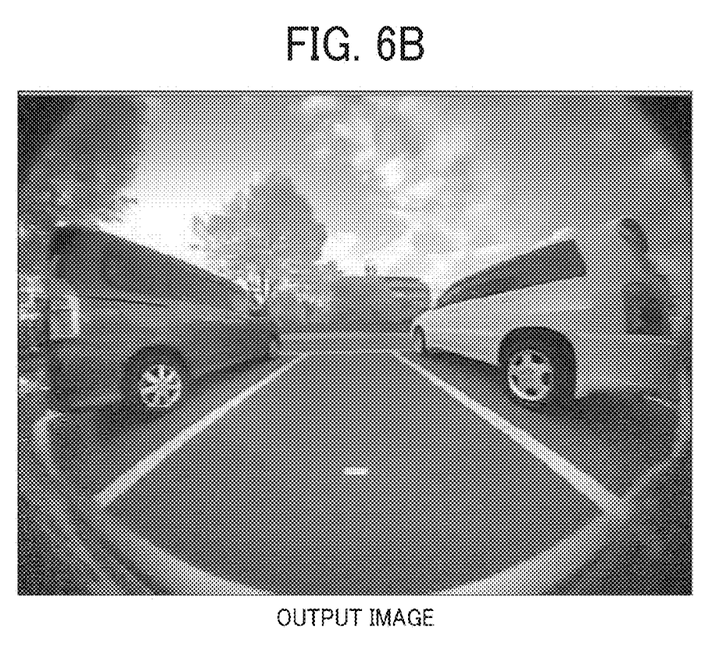

FIG. 6 is a diagram illustrating specific images. FIG. 6A is an original image and FIG. 6B is an example of the output image after the compression, decompression, and interpolation as described above. The output image is almost non-discernable from the original image to human eyes.

Embodiment 2

Figure 7:
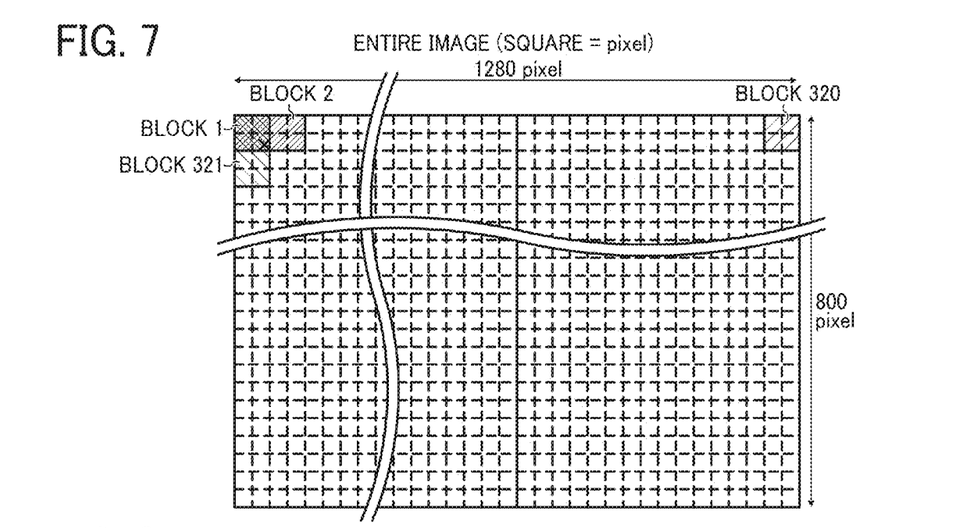
FIG. 7 is a diagram illustrating the relationship between the boundary of a block and the interpolation processing.

In the configuration and operation of Embodiment 1, for example, when the luminance information about the position marked by x in FIG. 7 is tried to obtain, the position is on the boundary of the blocks so that the information of the surrounding four pixels is not obtained from one block, thereby making the interpolation impossible.

Therefore, in this embodiment, the image compression unit 210 is dual and the second data compression unit shifts one pixel about the luminance signals followed by block division and generates compressed image data by block. When the compressed image data are written into the frame buffer 220, the image space in which the block is shifted one pixel are written into the memory in addition to the image space which is normally processed. The compressed image deforming unit 260 selects from which image space the compressed image data of the block are read out according to the read-out coordinate.

Figure 8:
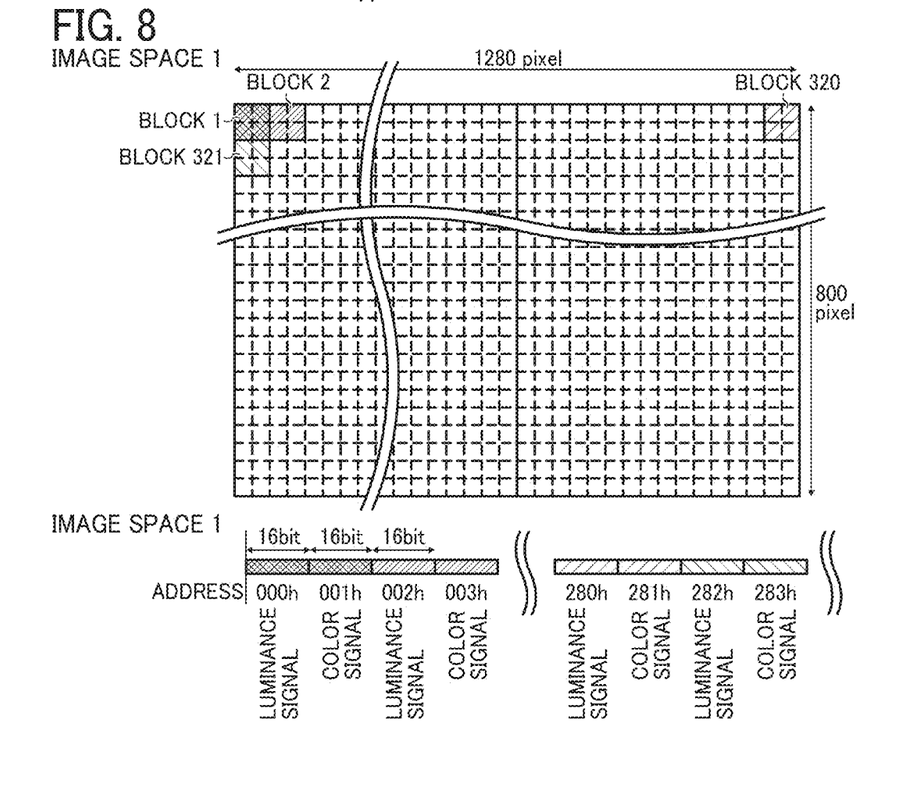
FIG. 8 is a diagram illustrating the screen before the block unit is shifted one pixel.
Figure 9:
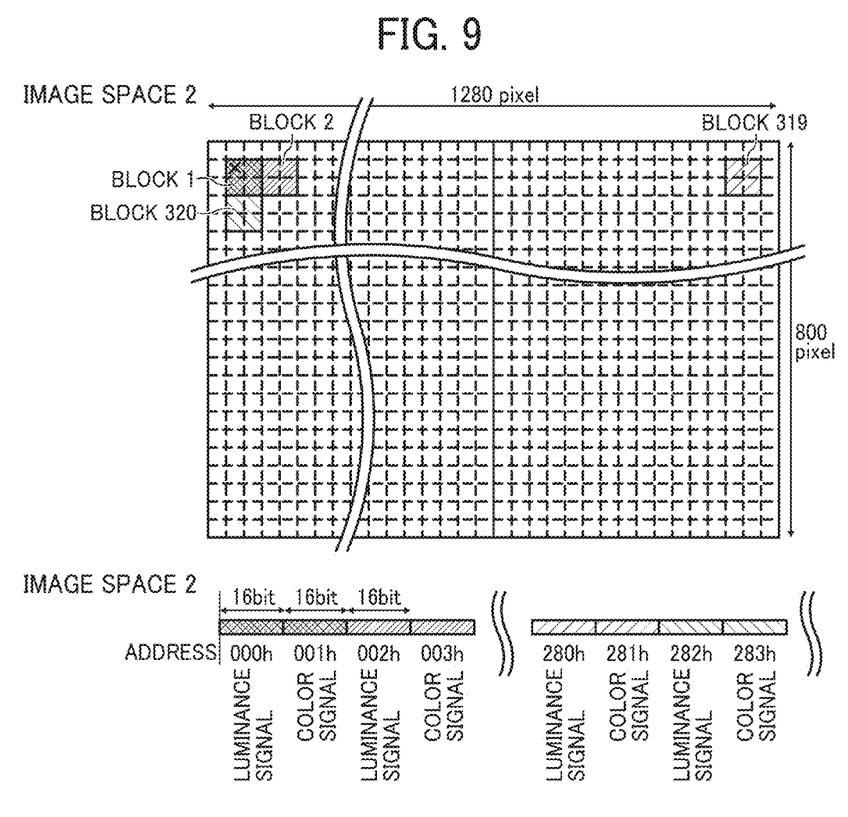
FIG. 9 is a diagram illustrating the screen after the block unit is shifted one pixel.

FIGS. 8 and 9 are diagrams illustrating the processing image of Embodiment 2. FIG. 8 is a diagram of an image space 1 of the normal process (corresponding to Embodiment 1) and FIG. 9 is a diagram of an image space 2 in which one pixel is shifted from the image space 1. In the case of the position marked as x in FIG. 7, by using the image space 2 of FIG. 9, the luminance signals of the four surrounding pixels around the position marked as x can be obtained from a single block so that interpolating is securely conducted.

Although two image compression units and the capacity twice as much are required in this embodiment, interpolation is possible in the X direction and Y direction when reading out the coordinate of any position. When a single block is two pixels×two pixels or more, for example, four pixels×four pixels, the image space 1 and the image space 2 are overlapped a single pixel.

Figure 10:
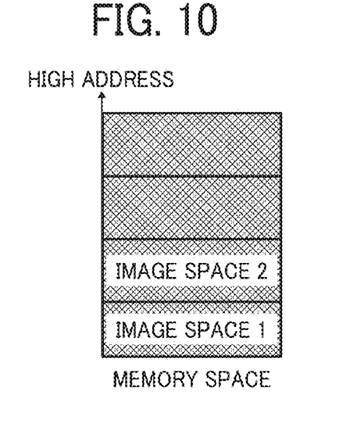
FIG. 10 is a diagram illustrating an example of a memory space for two images.
Figure 11:
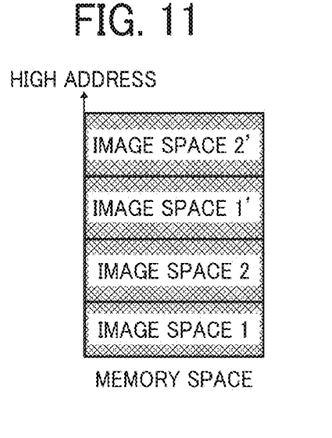
FIG. 11 is a diagram illustrating an example of a memory space employing a double buffer system.

FIG. 10 is a diagram illustrating an example of the arrangement of the image space 1 and the image space 2 on the memory. Other arrangements are possible. In the case of the double buffer system, there are four image spaces on the memory as illustrated in FIG. 11.

Embodiment 3

Figure 12:
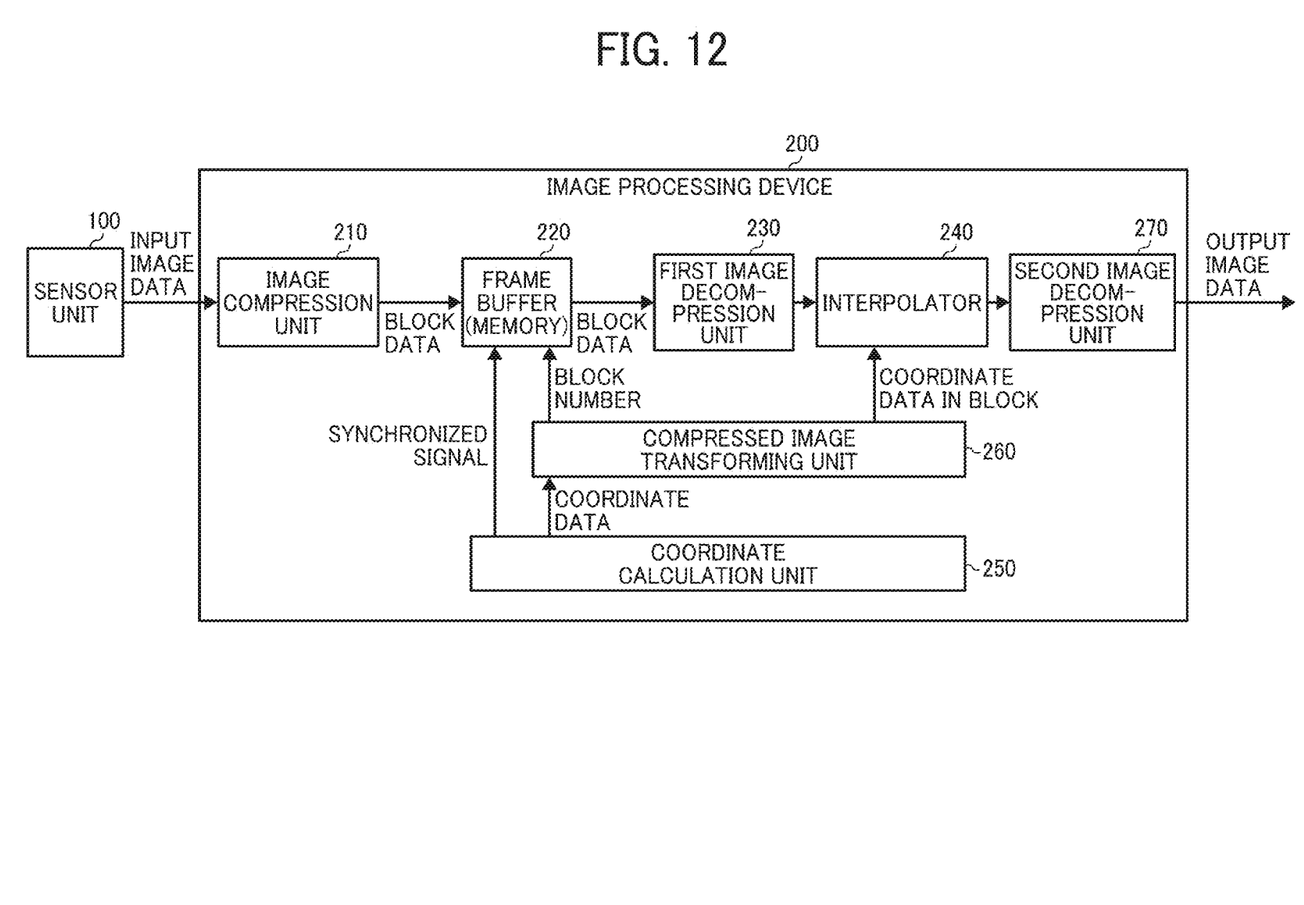
FIG. 12 is a diagram illustrating the entire configuration of another embodiment of an image processor according to the present disclosure.

FIG. 12 is a diagram illustrating the entire configuration of the image processor of Embodiment 3. This configuration is the same as in FIG. 1 except that a second image decompression unit 270 is added downstream from the interpolator 240.

To deform images, image data are read out from the memory (frame memory) by random access. To reduce the cost of the device, inexpensive DRAMs are preferable. However, since inexpensive DRAMs do not have a high driving frequency so that the random access speed is slow, it is too slow to calculate necessary address values, for example, to read out desired pixels in the main scanning direction to output regular NTSC.

In this embodiment, the number of pixels read out in the main scanning direction output from the frame buffer 220 is set to be smaller than the number of pixels of the output screen. For example, the number of pixels in the main scanning direction from the frame buffer 220 amounts to 500 pixels, which is smaller and thereafter, in the second image decompression unit 270, the read out pixels are decompressed to 720 pixels by the decompression processing in the main scanning direction.

To be specific, in the second image decompression unit 270, the image data of 500 pixels per line output from the interpolator 240 are written into, for example, an FIFO memory, which is thereafter read out. When read enable signals to read out the image data from the FIFO memory are High for 14 clocks and Low for 6 clocks, 14 pixels are read out each time. This is repeated 35 times and the last time is high for 10 clocks and Low for 10 clocks to read image data of 500 pixels per line.

Figures 13A, 13B:
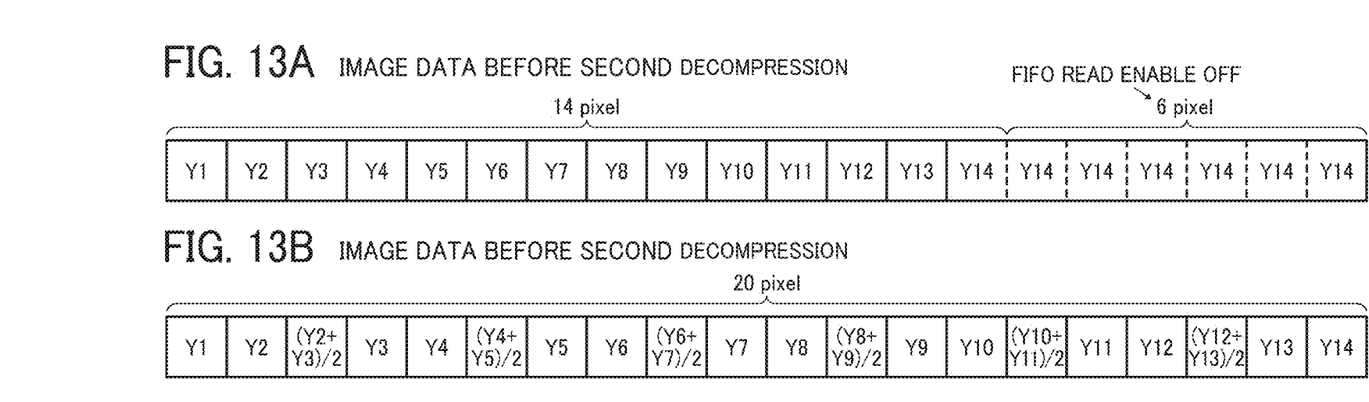
FIGS. 13A and 13B are diagrams of describing an decompression processing at a second image decompression unit of FIG. 12.

FIG. 13A is a diagram illustrating an image data set read out from the FIFO memory every time. This image data set is decompressed by the interpolation processing as illustrated in FIG. 13B. This is repeated 35+1 times so that the image data of 500 pixels per line are decompressed to image data of 720 pixels.

FIGS. 13A and 13B illustrate just an example. The way of decompression is not limited thereto as long as the number of pixels required to output an image finally in the main scanning direction are obtained.

Figure 14:
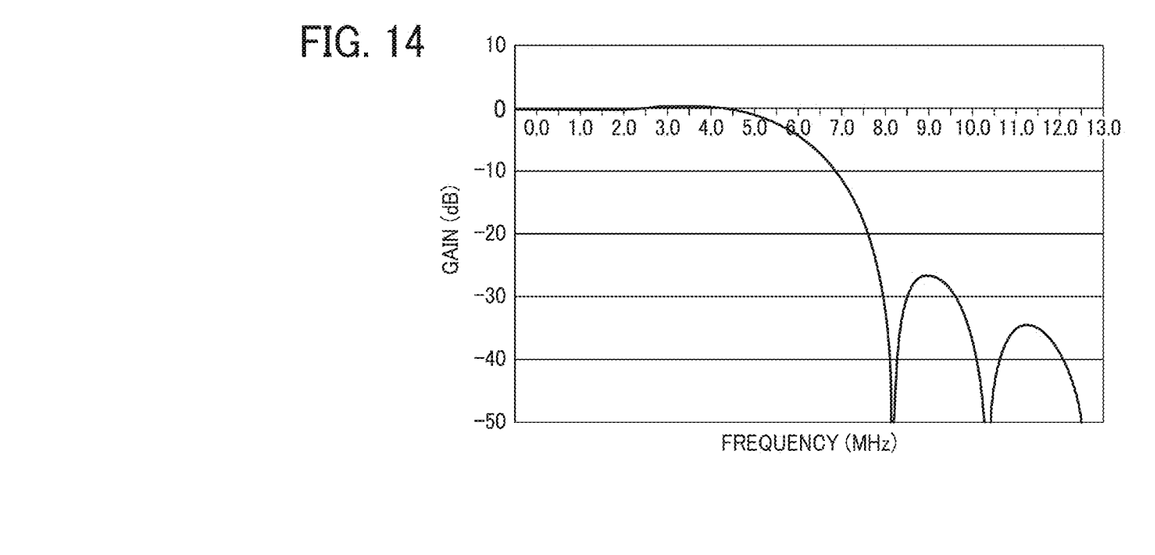
FIG. 14 is a diagram illustrating the frequency characteristics of the luminance signals of an image display.

FIG. 14 is a diagram illustrating typical frequency characteristics of the luminance signals of a display. When the horizontal definition of the NTSC signal is calculated, the result is: 8.0 MHz/30 fps/525 lines =507 lines. As seen in FIG. 14, even when image data of 720 pixels per line are read out from the memory, the output speed to NTSC is a bottleneck so that degradation rarely occurs around 500 pixels.

Embodiment 4

In this embodiment, an overlay unit is provided downstream from the interpolator 240 in FIG. 1 or the second image decompression unit 270 in FIG. 12. In the vehicle mounted camera system, the positions of the markers such as vehicle width lines or distance lines can be changed to cover many kinds of vehicles. By this overlay unit, such vehicle width lines or distance lines are overlapped with an output image.

Displaying the vehicle width lines displaying the width of the vehicle or the distance lines displaying the distance from the vehicle on the display of the rearview camera, etc., helps a driver to park a vehicle safely.

What is claimed is:

1. An image processor comprising:
    an image compression unit to generate first compressed image data by dividing input image data into blocks of M×M pixels with regard to at least luminance signals (Y) of the input image data, wavelet-converting the image data in units of blocks, and reducing the number of bits by quantization;
    a memory to store the first compressed image data;
    a coordinate calculator to calculate coordinates to deform images by coordinate conversion and output coordinate information;
    a compressed image deforming unit to generate compressed deformed image data by reading out the first compressed image data stored in the memory while conducting coordinate conversion based on the coordinate information from the coordinate calculator; and
    a first image decompression unit to decompress the compressed deformed image data to obtain decompressed image data.

2. The image processor according to claim 1, wherein the image compression unit compresses the input image data by converting to YUV=4:1:1 with regard to color signals (UV) of the input image data.

3. The image processor according to claim 1, wherein the image compression unit reduces the number of bits of HL, LH, and HH components among LL, HL, LH, and HH components of the wavelet conversion.

4. The image processor according to claim 3, wherein the image compression unit reduces the number of bits of HH component most.

5. The image processor according to claim 1, further comprising an interpolator to interpolate the decompressed image data by block decompressed by the first image decompression unit with regard to at least the luminance signals based on the coordinate information in the block output from the coordinate calculator.

6. The image processor according to claim 5, wherein the interpolator outputs the color signals as they are.

7. The image processor according to claim 5, wherein the image compression unit generates second compressed image data from the first compressed image data by shifting the blocks in the first compressed image data a predetermined number of pixels with regard to at least the luminance signals and stores the second compressed image data in the memory,
    wherein the compressed image deforming unit selects the first compressed image data or the second compressed image data so as to conduct interpolation of the pixel situated outermost in the block when reading the first compressed image data or the second compressed image data from the memory.

8. The image processor according to claim 1, further comprising a second image decompression unit arranged downstream from the first image decompression unit to change a size of an output image.

9. The image processor according to claim 1, wherein the memory employs a double buffer system in which address spaces are separated for writing and reading-out.

10. An image processing method comprising the steps of:
compressing input image data to generate first compressed image data in which the input image data are divided into blocks of M×M pixels with regard to at least luminous signals (Y), followed by wavelet conversion by block and reduction of the number of bits by quantization;
storing the first compressed image data in a memory;
calculating coordinates to obtain and output coordinate information to deform the input image by coordinate conversion;
generating compressed deformed image data by reading out the first compressed image data stores in the memory while conducting coordinate conversion based on the coordinate information; and
decompressing the compressed deformed image data to obtain decompressed image data.

11. The image processing method according to claim 10, wherein, in the compressing step, the input image data are compressed by converting color signals (UV) of the input image data to YUV=4:1:1.

12. The image processing method according to claim 10, wherein, in the compressing step, the number of bits of HL, LH, and HH components among LL, HL, LH, and HH components of the wavelet conversion is reduced.

13. The image processing method according to claim 12, wherein, in the compressing step, the number of bits of HH component is reduced most.

14. The image processing method according to claim 10, further comprising interpolating the decompressed image data by block with regard to at least the luminance signals based on the coordinate information in the block.

15. The image processing method according to claim 14, wherein, in the interpolating step, the color signals are output as they are.

16. The image processing method according to claim 14, wherein the compressing step comprises;
generating second compressed image data from the first compressed image data by shifting the blocks in the first compressed image data a predetermined number of pixels with regard to at least the luminance signals; and
storing the second compressed image data in the memory, wherein, in the generating compressed deformed image data step, the first compressed image data or the second compressed image data is selected so as to conduct interpolation of the pixel situated outermost in the block when reading the first compressed image data or the second compressed image data from the memory.

17. The image processing method according to claim 10, further comprising changing a size of an output image.

* * * * *